United States Patent [19]

Hashimoto et al.

[11] Patent Number: 4,865,143

[45] Date of Patent: Sep. 12, 1989

[54] TORQUE DETECTING DEVICE

[75] Inventors: Akio Hashimoto; Hiroshi Naito, both of Toyota, Japan

[73] Assignee: Aisin Seiki Kabushiki Kaisha, Japan

[21] Appl. No.: 152,282

[22] Filed: Feb. 4, 1988

[30] Foreign Application Priority Data

Feb. 5, 1987 [JP] Japan .................................. 62-25228

[51] Int. Cl.$^4$ ............................................ B62D 5/04
[52] U.S. Cl. .................................. 180/79.1; 73/862.33
[58] Field of Search ...................... 180/79.1; 73/862.33

[56] References Cited

U.S. PATENT DOCUMENTS

| | | | |
|---|---|---|---|
| 4,538,698 | 9/1985 | Hashimoto et al. | 180/79.1 |
| 4,561,515 | 12/1985 | Hashimoto et al. | 180/79.1 |
| 4,574,903 | 3/1986 | Hashimoto et al. | 180/79.1 |
| 4,580,648 | 4/1986 | Murakami et al. | 180/79.1 |
| 4,591,014 | 5/1986 | Yasuda | 180/79.1 |
| 4,611,682 | 9/1986 | Yasuda et al. | 180/79.1 |
| 4,614,248 | 9/1986 | Kakinami et al. | 180/79.1 |
| 4,621,701 | 11/1986 | Takabayashi et al. | 180/79.1 |
| 4,645,024 | 2/1987 | Takabayashi | 180/79.1 |
| 4,667,759 | 5/1987 | Hashimoto et al. | 180/79.1 |
| 4,674,588 | 6/1987 | Yasuda et al. | 180/142 |
| 4,724,711 | 2/1988 | Sakakibara et al. | 73/862.33 |
| 4,724,917 | 2/1988 | Naito et al. | 180/79.1 |
| 4,753,310 | 6/1988 | Hashimoto | 180/79.1 |
| 4,778,022 | 10/1988 | Kamiya | 180/79.1 |
| 4,784,234 | 11/1988 | Naito et al. | 180/79.1 |
| 4,809,173 | 2/1989 | Fukami et al. | 364/424.05 |

Primary Examiner—Kenneth R. Rice
Attorney, Agent, or Firm—Banner, Birch, McKie and Beckett

[57] ABSTRACT

A torque detecting device, which is typically used for detecting a steering torque in a motor vehicle, includes a mechanism for converting the torque applied to an input shaft to an axial force between the input shaft and an output shaft. A slider is fitted about the output shaft movably axially along the output shaft and rotatably about its own axis with the output shaft. The axial movement of the slider is electrically detected. An elastic body is provided for returning the input shaft to its neutral position. The converting mechanism has a pin extending through the input shaft at right angles thereto and having two ends projecting therefrom. A pair of slits each having a pair of ends are formed in the output shaft. Each of the ends of the pin is located in one of the slits engageably with either end thereof. A bearing is secured to one end of the pin. A spiral groove is formed in the slider and one end of the pin extends into the groove to dispose the bearing therein.

14 Claims, 4 Drawing Sheets

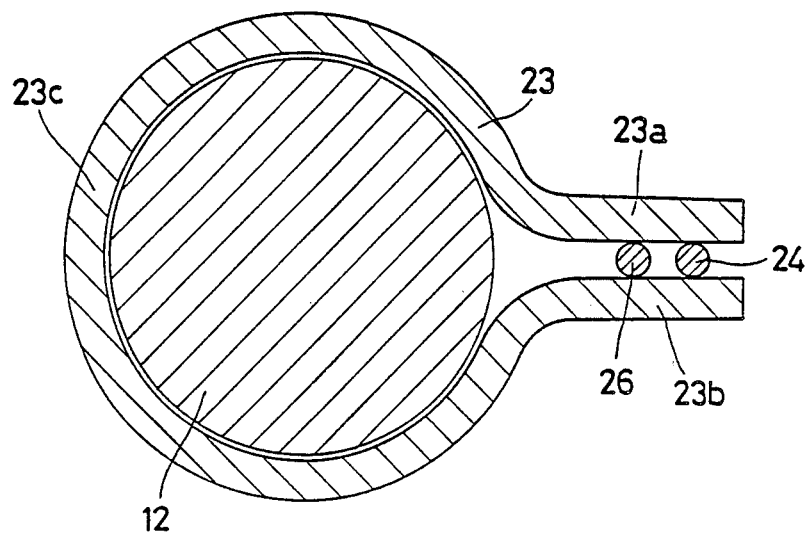
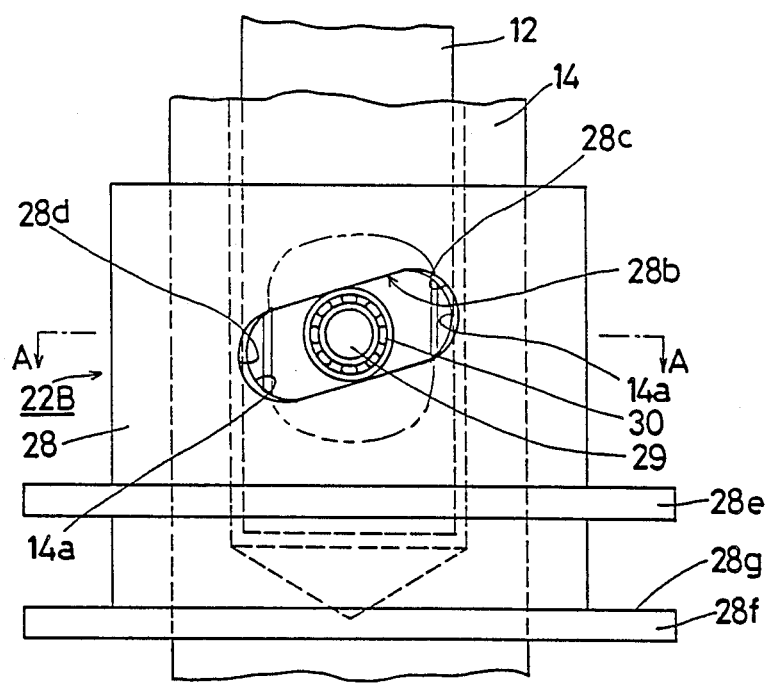

TORQUE DETECTING DEVICE

BACKGROUND OF THE INVENTION

1. Field of the Invention

This invention relates to a torque detecting device. More particularly, it is a device which can, for example, be used for converting the steering torque of an electric power steering system to an axial force, detecting its magnitude and direction and transmitting an output to an electric motor to control its driving force.

2. Description of the Prior Art

Devices for detecting the steering torque of an electric power steering system are disclosed in Japanese Laid-Open Utility Model Specifications Nos. 171670/1980 and 171671/1980. One type of device includes an input shaft connected to a steering wheel and having a lower end portion received in the upper end portion of a sleeve having a lower end portion splined about the upper end portion of an output shaft connected to a steering gear. The sleeve is held in position by a spring. The upper end portion of the sleeve has an axially inclined guide groove and the lower end portion of the input shaft has a guide pin received in the guide groove.

According to another type of device, an input shaft which is connected to a steering wheel has a lower end portion fitted rotatably in the upper end portion of an output shaft and having an axially straight slit, while the upper end portion of the output shaft has an axially inclined slit. A guide pin extends through the two slits and is connected to a ring fitted loosely about the output shaft. The ring is held in position by a spring.

If a steering torque is applied to the input shaft, the guide pin moves along the guide groove or the two slits and cooperates with the guide groove or the slits to produce a cam action which moves the sleeve or the ring axially of the shaft. Two switches are provided about the sleeve or the ring for detecting the axial movement thereof and closing a driving circuit for an electric motor to control its rotation.

As the cam action is produced by the sliding contact of the guide pin with the surface of the sleeve defining the guide groove or the surface of the output shaft defining the slit, however, the guide pin is likely to stick to the sleeve or the output shaft and thereby prevent the smooth movement of the sleeve or the ring, resulting in the vibration of the motor.

An improved device is, therefore, proposed in Japanese Laid-Open Patent Specification No. 177773/1983. This device includes a stepped shaft connected to an input shaft and having a diametrically enlarged portion provided with an inclined groove or a roller. A sleeve is connected to an output shaft rotatably therewith and vertically slidably. The sleeve has an inner surface provided with a roller which is slidably received in the groove on the diametrically enlarged portion of the stepped shaft, or an inclined groove in which the roller on the stepped shaft is slidably received. If a steering torque is applied to the input shaft, the roller on the stepped shaft or on the sleeve moves about the axis of the shaft along the inclined groove and thereby produces a cam action which moves the sleeve axially of the shaft. A potentiometer detects its axial movement and outputs a torque signal to control an electric motor.

The roller in the improved device receives so small a sliding resistance that it hardly sticks to the sleeve or the stepped shaft. Therefore, it is virtually unlikely that such sticking may prevent the smooth movement of the sleeve. The roller is, however, engaged in the groove for limiting the vertical movement of the sleeve, and for transmitting the rotation of the input shaft to the output shaft when the motor has failed. In other words, the roller itself defines a manual locking member. Therefore, a large external force is likely to act on the roller and deform, crack, or otherwise damage it. As a result there is every likelihood of the sleeve failing to move smoothly.

SUMMARY OF THE INVENTION

Under these circumstances, it is an object of this invention to provide a torque detecting device of improved reliability.

It is another object of this invention to provide a torque detecting device including a cam mechanism on which no large external force acts when the movement of a sleeve is limited.

It is still another object of this invention to provide a torque detecting device including a cam mechanism on which no large external force acts when a manual locking mechanism operates in the event that an electric motor has failed.

These objects are attained by a device which comprises a mechanism for converting the torque applied between an input shaft and an output shaft to an axial force, a slider fitted about the output shaft movable axially along the output shaft by the converting mechanism and rotatable about its own axis with the output shaft, a detector for detecting the axial movement of the slider electrically, and an elastic body for returning the input shaft to its neutral position, the converting mechanism having a pin extending through the input shaft at right angles thereto and having two ends projecting from the input shaft, a pair of slits formed in the output shaft and each having a pair of ends, each of the projecting ends of the pin being located in one of the slits engageably with either end thereof, a bearing secured to one of the projecting ends of the pin, and a spiral groove formed in the slider, the bearing being disposed in the spiral groove.

If torque is applied to the input shaft, the bearing moves along the spiral groove. The bearing and the spiral groove define a cam mechanism which can effectively convert the torque to an axial force and cause the slider to move vertically along the output shaft. The detector detects the axial movement of the slider electrically and produces an output signal indicating the magnitude and direction of the torque applied to the input shaft. The projecting ends of the pin and the slits define a manual locking mechanism which limits the axial movement of the slider and transmits the rotation of the input shaft to the output shaft when an electric motor has failed.

The slits and the spiral groove are so related to each other dimensionally that each projecting end of the pin may reach either end of one of the slits before the bearing reaches either edge of the groove. Therefore, the operation of the manual locking mechanism does not impose on the bearing any force that is so large as to deform or otherwise damage it.

The slider is not an element for transmitting torque from the input shaft to the output shaft. Therefore, it is not twisted or otherwise put out of order, but is slidable accurately and smoothly.

Therefore, the device of this invention is an accurate and reliable torque sensor.

BRIEF DESCRIPTION OF THE DRAWINGS

FIG. 2 is an enlarged cross sectional view of an input shaft and an elastic member in the device of FIG. 1;

FIG. 3 is an enlarged elevational view of a mechanism for converting torque to an axial force in the device of FIG. 1;

DETAILED DESCRIPTION OF THE INVENTION

Figure 1:
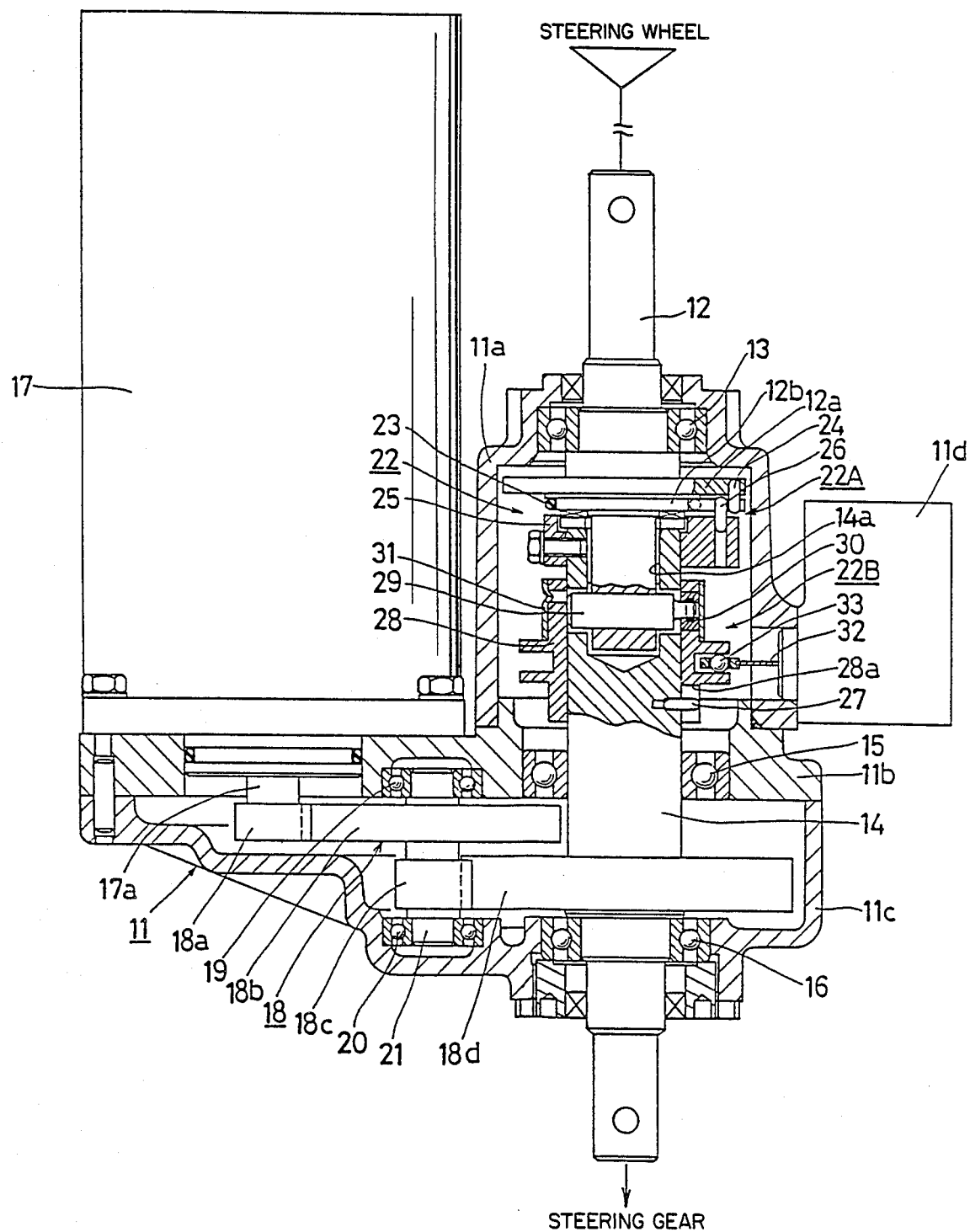
FIG. 1 is an elevational view, partly in section, of a steering torque detecting device embodying this invention.
Figure 4:
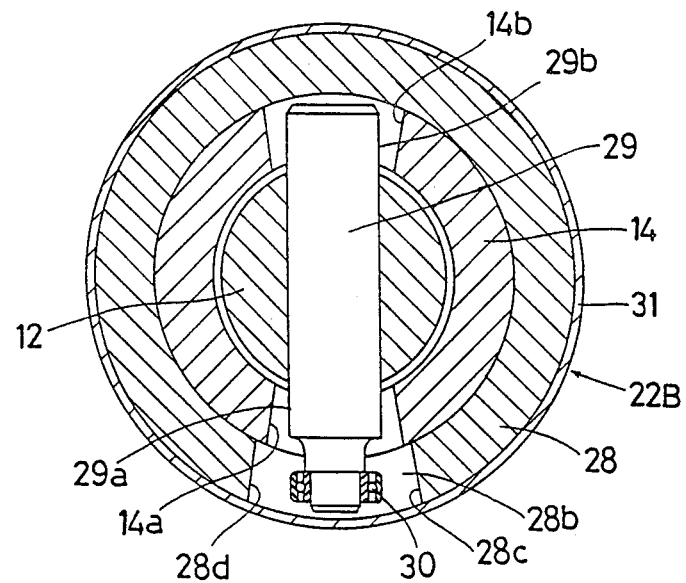
FIG. 4 is a sectional view taken along the line A—A of FIG. 3.

A steering torque detecting device embodying this invention is generally shown by way of example in FIG. 1. The device includes a housing 11 secured to a vehicle body and composed of four portions 11a to 11d which are bolted or welded together. An input shaft 12, which is connected to a steering wheel not shown, is rotatably supported by a ball bearing 13 in the housing portion 11a, and has a flange 12a in its mid-portion. An output shaft 14, which is connected to a steering gear not shown, has an upper end provided with an axial hole 14a and the input shaft 12 has a lower end portion fitted loosely, in the hole 14a. The output shaft 14 also has a middle portion and a lower end portion which are rotatably supported by ball bearings 15 and 16, respectively, in the housing portions 11b and 11c, respectively.

A reduction gear train 18 is provided in the lowermost housing portion 11c for reducing the output of an electric motor 17, which is bolted to the housing portion 11b, when it is transmitted from its output shaft 17a to the output shaft 14. The gear train 18 comprises a gear 18a connected to the output shaft 17a coaxially therewith, a gear 18b carried on a shaft 21 which is rotatably supported by ball bearings 19 and 20 in the housing portions 11b and 11c, respectively, a gear 18c carried on the shaft 21 coaxially with the gear 18b, and a gear 18d carried on the output shaft 14 coaxially therewith. The gear 18a meshes with the gear 18b, while the gear 18c meshes with the gear 18d.

A mechanism 22 for converting torque to an axial force is provided in the uppermost housing portion 11a for producing between the shafts 12 and 14 a twisted angular motion corresponding to the torque which is applied to the input shaft 12. The mechanism 22 comprises a torque balance detector 22A and a torque to axial force converter 22B.

The detector 22A comprises a substantially C-shaped wire spring 23 lying horizontally and surrounding the input shaft 12, a pin 24 secured to the flange 12a of the input shaft 12, and a pin 26 secured to a plate 25 fitted about the output shaft 14, as shown in FIGS. 1 and 2. The plate 25 is bolted to the output shaft 14 and is rotatable therewith. The spring 23 has a substantially circular portion 23c fitted about a boss 12b on the input shaft 12, and a pair of laterally projecting parallel end portions 23a and 23b between which the pins 24 and 26 are vertically held. The pin 26 is located between the boss 12b and the pin 24. A bush and a washer are disposed between the boss 12b and the output shaft 14.

As long as no torque is applied to the input shaft 12, the spring 23 stays in such a position that its end portions 23a and 23b have a minimum distance therebetween, and the input and output shafts 12 and 14 maintain their neutral positional relationship in which no twisted angular motion is produced. If any torque is applied to the input shaft 12, it is transmitted through the pin 24 to the spring 23 to space its end portions 23a and 23b apart from each other by a greater distance. The elastic deformation of the spring 23, therefore, produces between the input and output shafts 12 and 14 a twisted angular motion corresponding to the torque which has been applied to the input shaft 12.

The converter 22B is located below the detector 22A. It comprises a slider 28 fitted about the output shaft 14, a horizontal pin 29 secured to the input shaft 12 adjacent to the lower end thereof and having two end portions 29a and 29b projecting radially outwardly therefrom, a pair of equally sized slits 14a and 14b formed through the cylindrical wall of the output shaft 14 surrounding the lower end portion of the input shaft 12, a bearing 30 attached to the end portion 29a of the pin 29, and a spiral groove 28b formed through the wall of the slider 28 for holding the bearing 30 rotatably therein. The slider 28 has a vertical groove 28a and a pin 27 projecting radially outwardly from the output shaft 14 is vertically slidable in the groove 28a. The slits 14a and 14b are symmetric to each other with respect to the longitudinal axis of the output shaft 14 and extend at an angle to the horizontal. The end portions 29a and 29b of the pin 29 are located in the slits 14a and 14b, respectively. The end portions 29a and 29b are engageable with the diametrically opposite ends, respectively, of the slits 14a and 14b when the input shaft 12 is rotated. The spiral groove 28b is parallel to the slits 14a and 14b and has a length which is slightly larger than that of the slits 14a and 14b. The groove 28b has a width which is slightly larger than the outside diameter of the outer race of the bearing 30. The end portion 29a of the pin 29 extends through the slit 14a into the groove 28b. The slider 28 has a pair of radially outwardly projecting flanges 28e and 28f which are vertically spaced apart from each other.

The pin 27, which is vertically slidable along the groove 28a, permits the slider 28 to move vertically along the output shaft 14, but prevents it from rotating about the output shaft 14. A cylindrical member 31 is disposed about the slider 28 for holding the pin 29 in position.

When no twisted angular motion exists between the input and output shafts 12 and 14, the bearing 30 stays in the center of the spiral groove 28b in an equally spaced apart relation from the opposite ends 28c and 28d thereof, as shown in FIG. 3. If a twisted angular motion is produced between the shafts 12 and 14 as a result of the application of a steering torque to the input shaft 12, the bearing 30 is caused to rotate along the groove 28b and thereby produces a cam action which causes the slider 28 to move axially along the output shaft 14 by a distance depending on the twisted angular motion which has been produced. As a result, the upper and lower flanges 28e and 28f of the slider 28 are also moved along the output shaft 14.

Each of the end portions 29a and 29b of the pin 29 reach either end of the slit 14a or 14b before the bearing 30 reaches the end 28c or 28d of the spiral groove 28b, so that the axial movement of the slider 28 may be limited appropriately, and the rotation of the input shaft 12 may be transmitted to the output shaft 14 when the motor 17 has failed.

Figure 5:
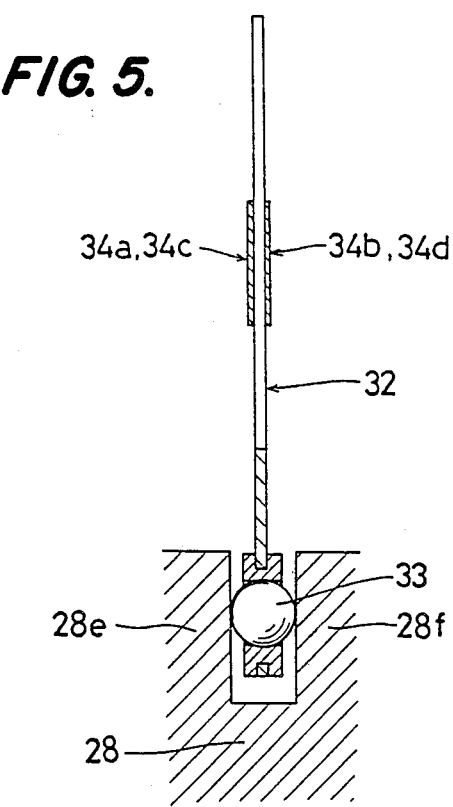
FIG. 5 is an enlarged elevational view of a cantilever in the device of FIG. 1.

The flanges 28e and 28f of the slider 28 define a groove 28g therebetween, as shown in FIG. 3. A cantilever 32 has one end carrying thereon a steel ball 33 which is held in the groove 28g, as shown in FIG. 5. The ball 33 is provided for connecting the cantilever 32 to the slider 28 in order to minimize the resistance to the vertical movement of its flanges 28e and 28f.

The other end of the cantilever 32 is threadedly connected to a member bolted to the housing portion 11d, so that the cantilever 32 may be accurately positioned. The cantilever 32 is provided with four strain gages 34a, 34b, 34c and 34d forming a resistance bridge and bonded to the opposite sides thereof in its intermediate portion which is slightly closer to the other end of the cantilever 32 than to the free end thereof on which the ball 33 is carried. The strain gages 34a to 34d are provided on an insulating layer covering the surface of the cantilever 32. The strain gages 34a to 34d produce a minimum output when no movement of the slider 28 acts on the free end of the cantilever 32, and produces a maximum output if the maximum movement of the slider 28 acts on the free end of the cantilever 32.

The cantilever 32 may be formed from phosphor bronze. Each of the strain gages 34a to 34d may have a surface coated with a moisture-proof substance protecting it from oil and moisture, and further with silicone rubber, etc.

Figure 6:
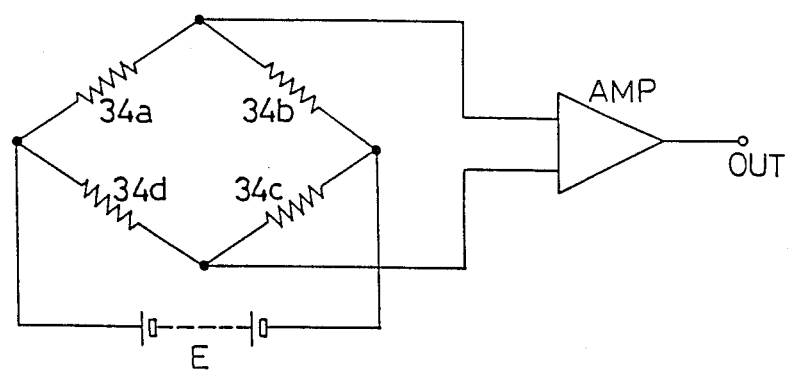
FIG. 6 is a diagram showing a known bridge circuit including a strain gage.

The strain gages 34a to 34d form a bridge circuit in a known way as shown in FIG. 6. It further includes a power source E of constant voltage and an amplifier AMP. The circuit, the cantilever 32 and the ball 33 form a detector 35 for detecting the axial movement of the slider 28 electrically.

Figure 7:
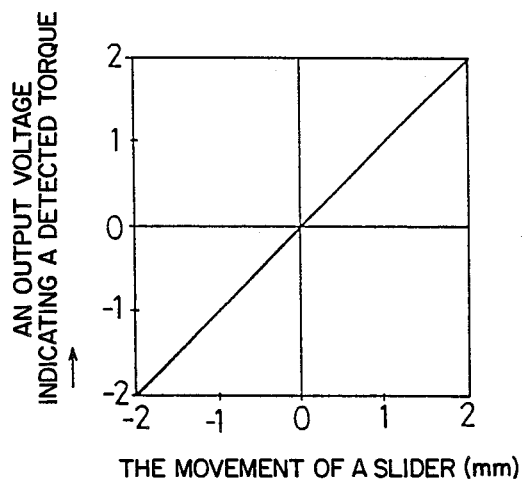
FIG. 7 is a graph showing an output voltage indicating a detected torque in relation to the movement of a slider in the device of FIG. 1.

FIG. 7 shows an output voltage indicating the detected torque on the input shaft 12 in relation to the distance of axial movement of the slider 28. A desirable relationship can be obtained if the amplifying ratio of the amplifier, the bias voltage, the resistance of the strain gages, etc. are appropriately selected.

If a steering torque is applied by the operator to the steering wheel connected to the input shaft 12, the spring 23 is elastically deformed to produce an angular motion corresponding to the torque between the input and output shafts 12 and 14. This angular motion is converted by the cam action of the bearing 30 and the spiral groove 28b to an axial movement of the slider 28. The axial movement of the slider 28 is transmitted through the ball 33 to the cantilever 32 and an output signal representing the magnitude and direction of the torque which has been applied to the input shaft 12 is produced by the strain gages 34a to 34d. This output signal is inputted to a controller not shown, so that the controller may control an electric current which is supplied to the motor 17. The motor 17 is driven and its rotation is transmitted to the output shaft 14 through the reduction gear train 18 to assist the operator in his steering endeavor.

The limitation of axial movement of the slider 28 along the output shaft 14 and the transmission of the rotation of the input shaft 12 to the output shaft 14 in the case of failure of the motor 17 are both effected by the end portions 29a and 29b of the pin 29 reaching the corresponding ends of the slits 14a and 14b, respectively, before the outer edge of the bearing 30 reaches either end of the spiral groove 28b, as hereinabove described. Therefore, the bearing 30 is not subjected on any such occasion to any external force that is so large as to deform or damage it and thereby affect the reliability in performance of the cam mechanism and hence of the torque detecting device.

What is claimed is:

1. A torque detecting system comprising:
    an input shaft positionable in a neutral position;
    an output shaft defining first and second slits, said first and second slits each having opposite slit ends;
    a converting means for converting torque applied to said input shaft to an axial force between said input shaft and said output shaft, said converting means comprising a rotatable bearing and a pin extending perpendicularly through said input shaft, said pin having first and second pin ends projecting from said input shaft and positioned in said first and second slits, respectively, said rotatable bearing being attached to said first pin end;
    a slider fitted about said output shaft and having a slider axis, said slider being movable axially along said output shaft by said converting means and rotatable with said output shaft about the slider axis, said slider defining a spiral groove in which said rotatable bearing is disposed and along which said bearing is rotatably movable, said spiral groove having spiral groove ends;
    a detecting means for electrically detecting axial movement of said slider; and
    a returning means for returning said input shaft to the neutral position;
    wherein said pin and said first and second slits define at least in part a manual locking mechanism which can limit axial movement of said slider and transmit manual rotation of said input shaft to said output shaft; and
    wherein said first and second slits, said spiral groove, said pin and said rotatable bearing are structurally configured and interrelated so that said first and second ends of said pins engaged said slit ends of said first and second slits, respectively, before said rotatable bearing engages either of said spiral groove ends, to thereby minimize an forces imposed on said rotatable bearing by the operation of said manual locking mechanism.

2. The torque detecting system of claim 1 wherein said detecting means produces an output signal indicating the magnitude and direction of the torque applied to said input shaft.

3. The torque detecting system of claim 1 further comprising a housing in which said converting mechanism is disposed, and said detecting means comprising a cantilever having a first end secured to said housing and a second end supported on said slider so that said cantilever can bend in either of two directions with the axial movement of said slider, and a plurality of strain gages carried on said cantilever.

4. The torque detecting system of claim 1 wherein said first and second slits and said spiral groove are parallel to one another.

5. The torque detecting system of claim 4 wherein said spiral groove is slightly larger than said first and second slits.

6. The torque detecting system of claim 1 wherein said spiral groove is longer than said first and second slits.

7. The torque detecting system of claim 1 wherein said returning means comprises a substantially C-shaped wire spring having a substantially circular portion fitted about said input shaft and a pair of parallel end portions projecting radially outwardly from said circular portion, and first and second pins projecting from said input and output shafts, respectively, and held between end portions of said wire spring.

8. The torque detecting system of claim 1 wherein said output shaft has a longitudinal axis, and said first and second slits are symmetric to each other with respect to said longitudinal axis.

9. The torque detecting system of claim 1 wherein said first and second slits extend at an angle to the horizontal.

10. The torque detecting system of claim 1 wherein said spiral groove has its width being slightly larger than the outside diameter of the outer race of said bearing.

11. The torque detecting system of claim 10 wherein said spiral groove is longer than said first and second slits.

12. The torque detecting system of claim 1 wherein said input shaft is connected to a steering wheel, and said output shaft is operatively connected to a steering gear.

13. The torque detecting system of claim 1 wherein said output shaft transmits an output thereof to an electric motor to control the driving force thereof.

14. The torque detecting system of claim 1 further comprising an electric motor transmitting rotation to said output shaft, and said manual locking mechanism transmitting rotation of said input shaft to said output shaft when said electric motor fails.

* * * * *